US009838303B2

(12) United States Patent
Nagarajan et al.

(10) Patent No.: US 9,838,303 B2
(45) Date of Patent: Dec. 5, 2017

(54) PIM SOURCE DISCOVERY BY LAST HOP ROUTER

(71) Applicant: Juniper Networks, Inc., Sunnyvale, CA (US)

(72) Inventors: Vikram Nagarajan, Chennai (IN); Anish Peter, Bangalore (IN); Robert W. Kebler, Newburyport, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 224 days.

(21) Appl. No.: 14/754,612

(22) Filed: Jun. 29, 2015

(65) Prior Publication Data
US 2016/0277199 A1    Sep. 22, 2016

(30) Foreign Application Priority Data

Mar. 20, 2015  (IN) .......................... 1409/CHE/2015

(51) Int. Cl.
| | |
|---|---|
| *H04L 12/761* | (2013.01) |
| *H04L 12/44* | (2006.01) |
| *H04L 12/725* | (2013.01) |
| *H04L 12/18* | (2006.01) |
| *H04L 12/773* | (2013.01) |

(52) U.S. Cl.
CPC ............ *H04L 45/30* (2013.01); *H04L 12/185* (2013.01); *H04L 12/1863* (2013.01); *H04L 12/44* (2013.01); *H04L 45/60* (2013.01)

(58) Field of Classification Search
None
See application file for complete search history.

(56) References Cited

U.S. PATENT DOCUMENTS

| | | | | |
|---|---|---|---|---|
| 7,969,978 B2* | 6/2011 | Napierala | ........... | H04L 12/1836 370/389 |
| 7,983,691 B1* | 7/2011 | Wong | ..................... | G01S 5/0284 455/414.2 |
| 8,611,346 B1 | 12/2013 | Wijnands et al. | | |
| 2004/0088307 A1* | 5/2004 | Von Bergen | ...... | G06F 17/30327 |
| 2004/0205215 A1* | 10/2004 | Kouvelas | ................ | H04L 12/18 709/231 |

(Continued)

OTHER PUBLICATIONS

Peter et al., "PIM source discovery in Last-Hop-Router; draft-anish-pim-stream-discovery-01," Protocol Independent Multicast, Internet Draft, Jul. 6, 2015, 11 pp.

(Continued)

*Primary Examiner* — Ayaz Sheikh
*Assistant Examiner* — Tarell Hampton
(74) *Attorney, Agent, or Firm* — Shumaker & Sieffert, P.A.

(57) ABSTRACT

Techniques are described for enhancements to Protocol Independent Multicast (PIM) to enable a last hop router (LHR) to perform source discovery and directly build or join a source tree. According to the techniques of this disclosure, the LHR builds a communication channel with a rendezvous point (RP) router and requests source information for at least one multicast group for which the LHR has interested receivers. The RP responds to the request by looking into a register database maintained by the RP and sending source information indicating at least one source that is actively providing traffic for the at least one multicast group. Based on the response, the LHR initiates a (S,G) PIM Join message toward the at least one source for the at least one multicast group to directly build or join at least one source tree.

30 Claims, 11 Drawing Sheets

(56) References Cited

U.S. PATENT DOCUMENTS

| | | | | |
|---|---|---|---|---|
| 2006/0291444 | A1* | 12/2006 | Alvarez | H04L 45/16 370/351 |
| 2007/0058627 | A1* | 3/2007 | Smith | H04L 12/1868 370/390 |
| 2007/0153790 | A1* | 7/2007 | Boers | H04L 12/18 370/390 |
| 2010/0195529 | A1* | 8/2010 | Liu | H04L 12/185 370/252 |
| 2011/0058548 | A1* | 3/2011 | Fernandez Gutierrez | H04L 12/185 370/390 |
| 2014/0269412 | A1* | 9/2014 | Venaas | H04L 45/16 370/254 |
| 2016/0277199 | A1 | 9/2016 | Nagarajan et al. | |
| 2017/0093589 | A1* | 3/2017 | Asthana | H04L 12/185 |

OTHER PUBLICATIONS

Fenner et al., "Protocol Independent Multicast—Sparse Mode (PIM-SIM) : Protocol Specification (Revised)," Network Working Group, RFC 4601, Aug. 2006, 150 pp.

Wijnands et al., "PIM Flooding Mechanism and Source Discovery," Network Working Group Internet Draft, draft-ietf-pim-source-discovery-bsr-01.pdf, Jul. 3, 2014, 10 pp.

Fenner et al., "Protocol Independent Multicast—Sparse Mode (PIM-SM): Protocol Specification (Revised)," RFC 4601, Network Working Group, The Internet Society, Aug. 2006, 112 pp.

Holbrook et al., "Source-Specific Multicast for IP," RFC 4607, Network Working Group, The Internet Society, Aug. 2006, 19 pp.

Farinacci et al., "A Reliable Transport Mechanism for PIM," RFC 6559, Internet Engineering Task Force, IETF, Mar. 2012, 27 pp.

Korhonen et al., "IPv6 for Third Generation Partnership Project (3GPP) Cellular Hosts," RFC 7066, Internet Engineering Task Force, IETF, Nov. 2013, 20 pp.

Ed et al., "Reliable Transport for PIM Register States," Network Working Group Internet Draft, draft-anish-reliable-pim-registers-00, Mar. 9, 2015, 19 pp.

Handley et al., "Bidirectional Protocol Independent Multicast (BIRDIR-PIM)," RFC 5015, Network Working Group, The Internet Society, Oct. 2007, 47 pp.

Adams et al., "Protocol Independent Multicast—Dense Mode (PIM-DM): Protocol Specification (Revised)," RFC 3973, Network Working Group, The Internet Society, Jan. 2005, 57 pp.

\* cited by examiner

PIM SOURCE DISCOVERY BY LAST HOP ROUTER

This application claims priority to India Patent Application No. 1409/CHE/2015, filed Mar. 20, 2015, the entire content of which is incorporated herein by reference.

TECHNICAL FIELD

The invention relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, techniques are described for enhancements to Protocol Independent Multicast (PIM) to enable a last hop router (LHR) to perform source discovery and directly build or join a source tree. According to the techniques of this disclosure, the LHR builds a communication channel with a rendezvous point (RP) router and requests source information for at least one multicast group for which the LHR has interested receivers. The RP responds to the request by looking into a register database maintained by the RP and sending source information indicating at least one source that is actively providing traffic for the at least one multicast group. Based on the response, the LHR initiates a (S,G) PIM Join message toward the at least one source for the at least one multicast group to directly build or join at least one source tree. A source tree may be defined as a multicast distribution tree established along a shortest path between a LHR connected to a receiver and a first hop router (FHR) connected to a source. The techniques avoid the issues of state explosion and data driven events encountered in conventional PIM Any Source Multicast (ASM) mode. The techniques also avoid the practical difficulty of pre-learning source information and configuring hosts with the source information encountered in conventional PIM Source-Specific Multicast (SSM) mode.

In one example, this disclosure is directed to a method comprising establishing, by a last hop router (LHR) in a network, a communication channel with a rendezvous point (RP) router in the network; sending, by the LHR to the RP router via the communication channel, a request for source information for at least one multicast group for which the LHR has interested receivers; receiving, by the LHR from the RP router via the communication channel, the source information indicating at least one source that is actively providing traffic for the at least one multicast group; initiating, by the LHR, establishment of at least one source tree toward the at least one source for the at least one multicast group; and, upon establishment of the at least one source tree, receiving, by the LHR, the traffic for the at least one multicast group over the at least one source tree.

In another example, this disclosure is directed to a network device operating as a last hop router (LHR) in a network. The LHR comprises a routing engine configured to establish a communication channel with a rendezvous point (RP) router in the network, send a request to the RP router via the communication channel for source information for at least one multicast group for which the LHR has interested receivers, receive from the RP router via the communication channel the source information indicating at least one source that is actively providing traffic for the at least one multicast group, and initiate establishment of at least one source tree toward the at least one source for the at least one multicast group. The LHR also comprises a forwarding engine configured to, upon establishment of the at least one source tree, receive the traffic for the at least one multicast group over the at least one source tree.

In a further example, this disclosure is directed to a method comprising establishing, by a rendezvous point (RP) router in a network, a communication channel with a last hop router (LHR) in the network; maintaining, by the RP router, a register database to track multicast groups, sources that are active for the multicast groups, and last hop routers (LHRs) that have expressed interest in the multicast groups; receiving, by the RP router from the LHR via the communication channel, a request for source information for at least one multicast group for which the LHR has interested receivers; determining, by the RP router, at least one source that is actively providing traffic for the at least one multicast group based on the register database; and sending, by the RP router to the LHR via the communication channel, the source information indicating the at least one source that is actively providing traffic for the at least one multicast group.

In an additional example, this disclosure is directed to a network device operating as a rendezvous point (RP) router in a network. The RP router comprises a routing engine configured to establish a communication channel with a last hop router (LHR) in the network, maintain a register database to track multicast groups, sources that are active for the multicast groups, and LHRs that have expressed interest in the multicast groups, receive a request from the LHR via the communication channel for source information for at least one multicast group for which the LHR has interested receivers, determine at least one source that is actively providing traffic for the at least one multicast group based on the register database, and send to the LHR via the communication channel the source information indicating the at least one source that is actively providing traffic for the at least one multicast group. The RP router also comprises a forwarding engine configured to forward traffic in the network.

The details of one or more examples of the invention are set forth in the accompanying drawings and the description below. Other features, objects, and advantages of the invention will be apparent from the description and drawings, and from the claims.

DETAILED DESCRIPTION

Figure 1:
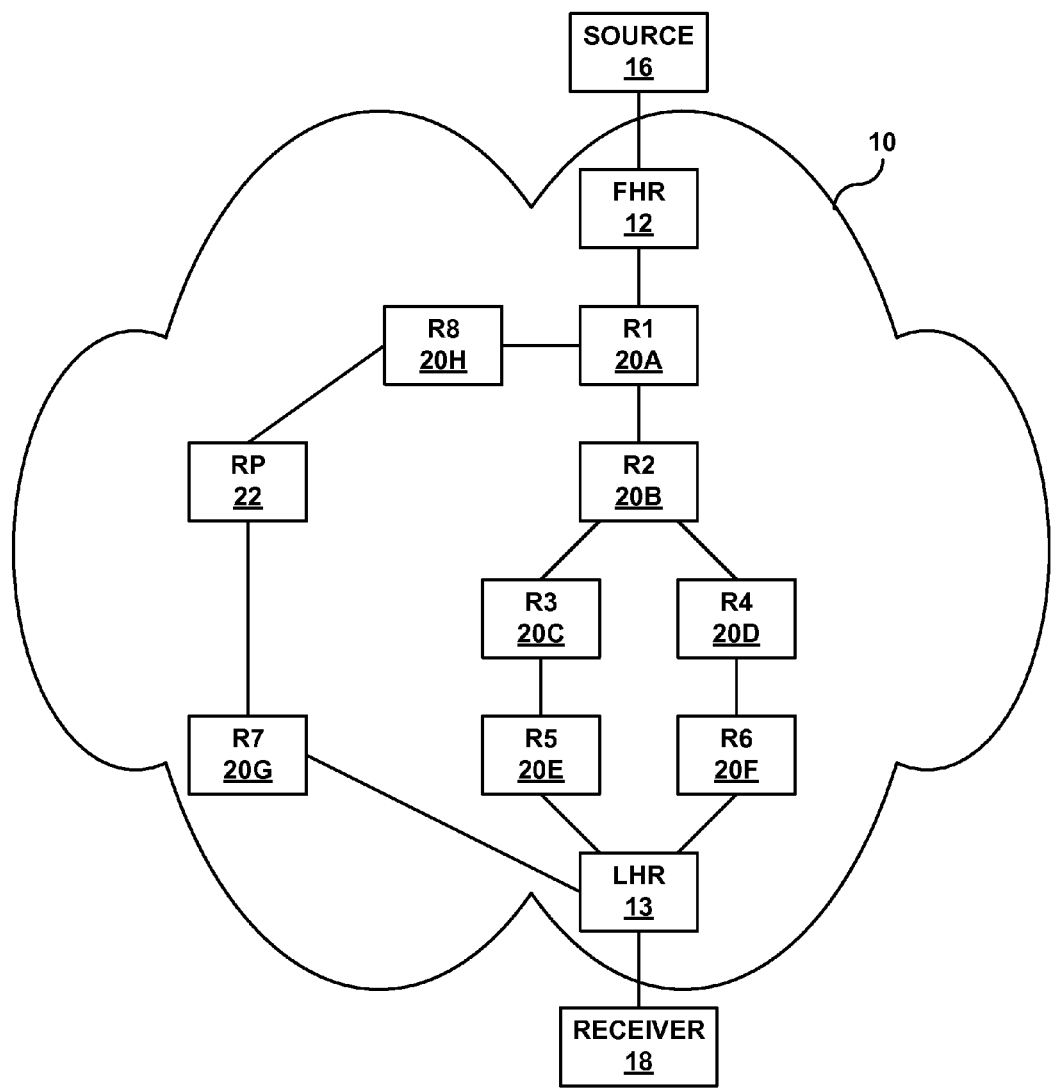
FIG. 1 is a block diagram illustrating an example computer network including routers configured to transmit multicast traffic between a source and a receiver.

FIG. 1 is a block diagram illustrating an example computer network 10 including routers configured to transmit multicast traffic between a source 16 and a receiver 18. Network 10 may comprise a private network or a public network, such as the Internet. For example, network 10 may be an enterprise network, a campus network, a service provider network, a home network, a local area network (LAN), a virtual local area network (VLAN), virtual private network (VPN), or another autonomous system. In any of these examples, remotely located source 16 and receiver 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including routing devices that use a Protocol Independent Multicast (PIM) protocol to route multicast traffic through network 10 between source 16 and receiver 18 for particular multicast groups. Network 10 includes a first hop router (FHR) 12 connected to source 16, a last hop router (LHR) 13 connected to receiver 18, a plurality of transit routers 20A-20H ("routers 20"), and a router designated as a rendezvous point (RP) 22. In a typical network topology that utilizes the PIM protocol, additional transit routers may be included to the left of RP 22 such that RP 22 is generally centrally located within network 10. For purposes of illustration, these additional routers are not shown in FIG. 1.

Each of source 16 and receiver 18 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

Source 16 may provide traffic for one or more multicast groups. Receiver 18 may request or subscribe to traffic from one or more multicast groups. In other examples, routers within network 10 may be connected to more than one source and/or more than one receiver. Receiver 18 may subscribe to a specific multicast group to receive multicast traffic. According to the PIM protocol, RP 22 learns and stores source addresses for a certain range of multicast groups provided by source 16 and/or other sources in network 10. Other RPs in network 10, not shown in FIG. 1, may be associated with different ranges of multicast groups provided by source 16 and/or the other sources. In this way, each of FHR 12, LHR 13, and routers 20 does not learn and store the source addresses for every multicast group offered in network 10, but only learns the addresses of RP 22 and the other RPs associated with different ranges of multicast groups. In the illustrated example of FIG. 1, RP 22 knows the address of source 16, but FHR 12, LHR 13 and routers 20 may only know the address of RP 22.

The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," IETF RFC 3973, 2005; Fenner, B., et al., "Protocol Independent Multicast—Sparse Mode (PIM-SM): Protocol Specification (Revised)," IETF RFC 4601, 2006; Holbrook, H. and B. Cain, "Source-Specific Multicast for IP," IETF RFC 4607, 2006; and Handley, M., et al., "Bidirectional Protocol Independent Multicast (BIDIR PIM)," IETF RFC 5015, 2007, the entire contents of each of which are incorporated by reference herein.

The techniques described in this disclosure provide enhancements to PIM to enable a last hop router (LHR) to perform source discovery to learn source addresses of multicast groups for which the LHR has interested receivers. According to the disclosed techniques, described in more detail with respect to FIGS. 4-8 below, the LHR builds a communication channel with a RP router, e.g., RP 22, to receive source information for one or more multicast groups for which the LHR has interested receivers. In this way, the LHR is able to build or join a source tree directly to a given source, e.g., source 16, instead of first building or joining a shared tree toward the RP router. For purposes of this disclosure, a source tree is defined as a multicast distribution tree established along a shortest path between a LHR connected to a receiver and a FHR connected to a source.

Figure 2A:
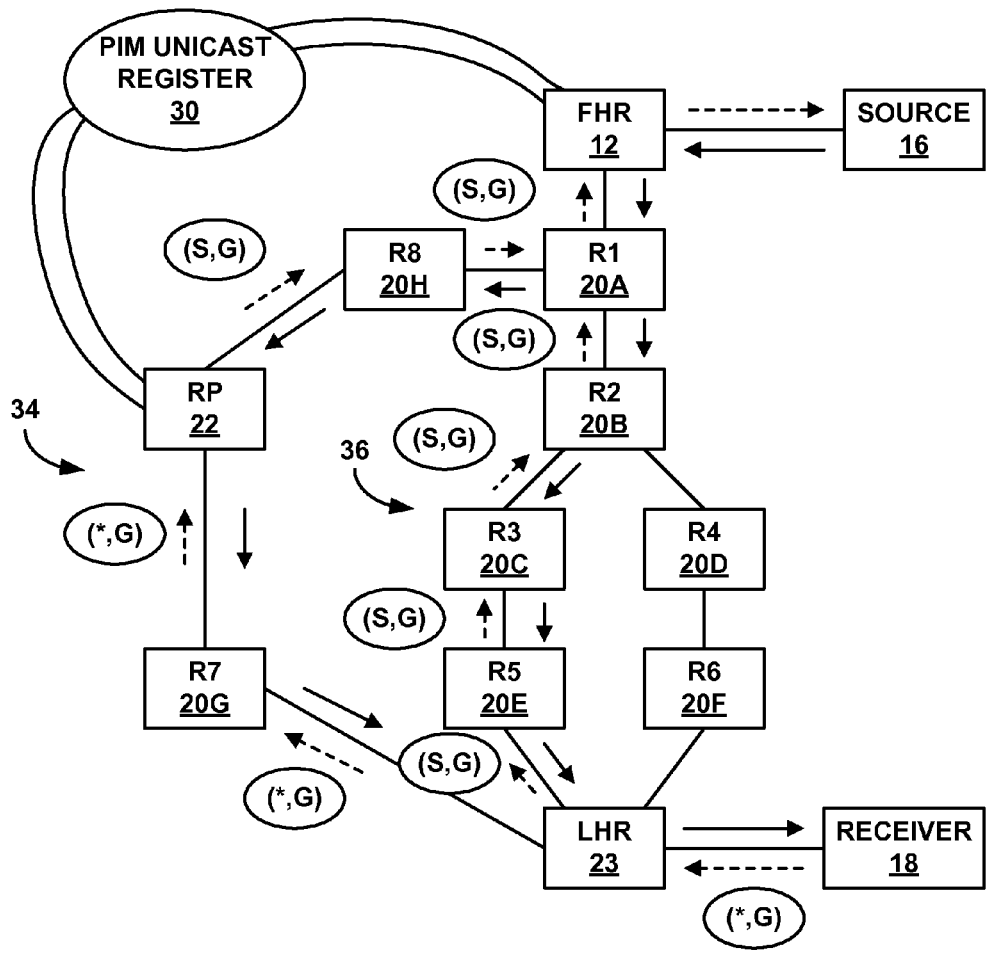
FIGS. 2A-2B are block diagrams illustrating a shared tree and a shortest path tree established by a last hop router according to Protocol Independent Multicast (PIM) Any Source Multicast (ASM) mode to transmit multicast traffic between a source and a receiver.
Figure 2B:
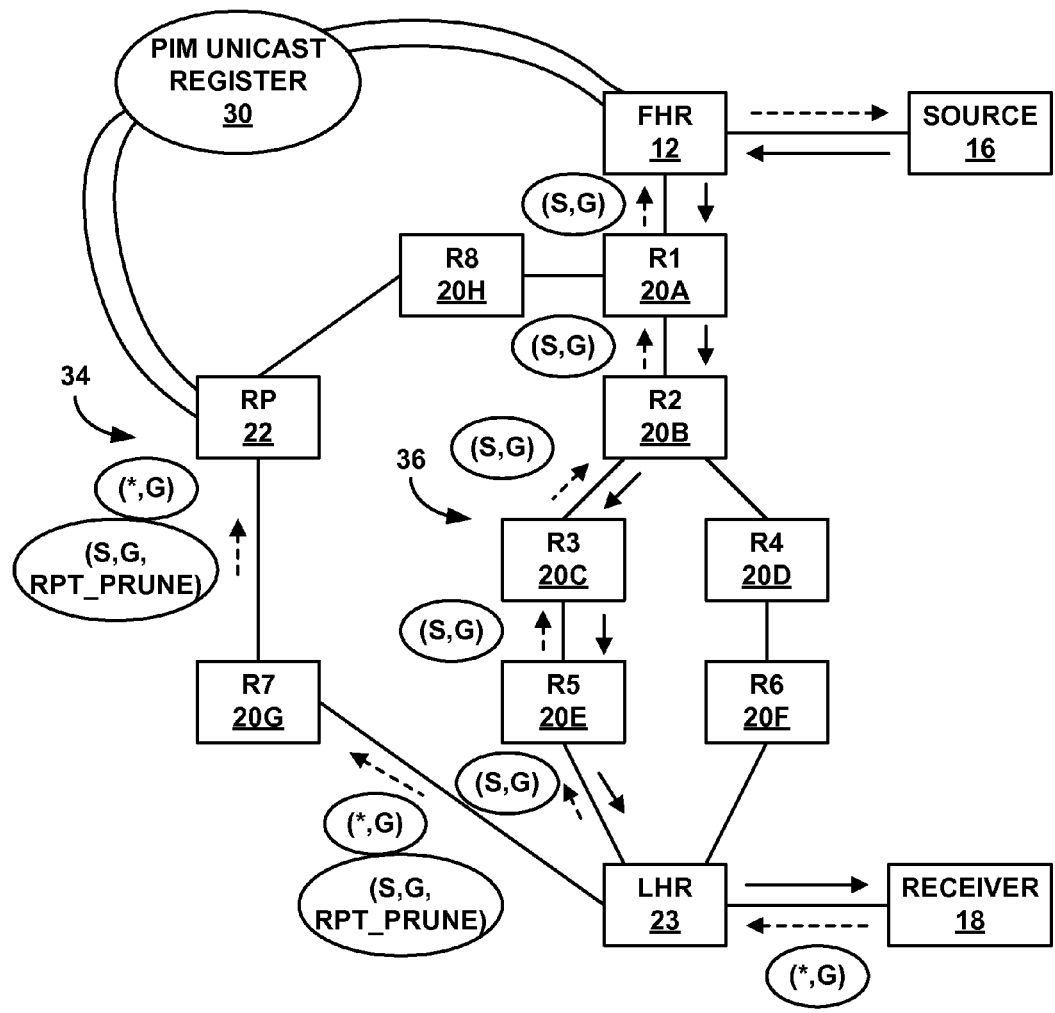

FIGS. 2A-2B are block diagrams illustrating a shared tree 34 and a shortest path tree 36 established by a last hop router (LHR) 23 according to the PIM ASM mode to transmit multicast traffic between source 16 and receiver 18. LHR 23 illustrated in FIGS. 2A-2B is configured to build multicast distribution trees according to the PIM ASM mode. In FIGS. 2A-2B, the dashed arrows indicate PIM Join messages sent towards RP 22 or source 12, and the solid arrows indicate multicast traffic being forwarded over shared tree 34 and shortest path tree 36 towards receiver 18. In some examples, shortest path tree 36 may also be referred to as a source tree.

The PIM ASM mode, which is described in more detail in RFC 4601 cited above, describes a mechanism in which multicast functionality is accomplished by building "shared/RP-trees," i.e., shared tree 34, and "shortest/source-path-trees," i.e., source tree or shortest path tree 36, and then "pruning the shared-tree for the source-tree." These different trees 34, 36 are in place because LHR 23 with interested listeners or receivers, e.g., receiver 18, does not have the knowledge of the sources, e.g., source 16, sending traffic for those groups. In the example of PIM ASM mode, LHR 23 joins a central router, i.e., RP 22, first and then moves to shortest path tree 36 after it discovers the source 16.

As illustrated in FIG. 2A, in the PIM ASM mode, LHR 23 first initiates establishment of a shared tree 34 by sending (*,G) PIM Join messages for a given multicast group requested by receiver 18 towards RP 22 via R7 20G. When source 16 starts sending multicast traffic for the given multicast group, FHR 12 sends out a unicast PIM Register packet 30 to RP 22. RP 22 then joins source 16 natively by sending (S,G) PIM Join messages for the source and the given multicast group towards source 16 via R8 20H, R1 20A and FHR 12. By virtue of the PIM Join messages, multicast traffic for the given multicast group starts flowing over the shared tree 34 to LHR 23 and then to receiver 18.

When LHR 23 receives the multicast traffic over shared tree 34, LHR 23 discovers a source address for source 16 from the multicast data packet and looks to join source 16 over the shortest path. To initiate establishment of shortest path tree 36, LHR 23 sends out (S,G) PIM Join messages for the source and the given multicast group towards source 16 via R5 20E, R3 20C, R2 20B, R1 20A and FHR 12. Upon receiving the (S,G) PIM Join messages, FHR 12 sends the multicast traffic for the given multicast group from source 16 over the shortest path tree 36 as well as the shared tree 34 to LHR 23 and then to receiver 18.

With the multicast traffic being received over both shared tree 34 and shortest path tree 36, LHR 23 sees traffic duplicates. LHR 23 should not forward the multicast traffic received from both shared tree 34 and shortest path tree 36 to receiver 18 as this will cause duplicates on the hosts. In real-world deployments of multicast traffic (e.g., IPTV) duplicate traffic is as much a problem as traffic loss. LHR 23 may detect the duplicate traffic by way of an incoming interface (IIF) mismatch event (i.e., IIF-MISMATCH) and decide to switch to only receive the multicast traffic for the given multicast group from shortest path tree 36. In other words, LHR 23 prunes the multicast traffic for the given multicast group from shared tree 34 and forwards the multicast traffic for the given multicast group that is received from shortest path tree 36.

As illustrated in FIG. 2B, to perform the shortest path tree (SPT) switch, LHR 23 sends (S,G,RPT_Prune) PIM Prune messages on shared tree 34 towards RP 22 via R7 20G to prune the multicast traffic for the given multicast group and the particular source 16 from shared tree 34. LHR 23 may still keep sending (*,G) PIM Join messages towards RP 22 to be able to receive multicast traffic from any other sources sending traffic for the same multicast group. In addition, LHR 23 programs a multicast route in its forwarding engine to have an upstream interface for the multicast route point to shortest path tree 36 (i.e., to an incoming interface (IIF) associated with R5 20E for shortest path tree 36).

As shown in FIG. 2B, the multicast traffic for the given multicast group flows only from FHR 12 to LHR 23 over shortest path tree 36, and does not flow over shared tree 34. In other words, shortest path tree 36 is a single-active path of the multicast group. In this example, even in steady state, there are PIM states that are maintained on routers 20 between LHR 23 and RP 22, between LHR 23 and FHR 12, and between FHR 12 and RP 22. All of these PIM states have to be periodically refreshed. In general, the above description relative to FIGS. 2A-2B explains how PIM ASM mode works.

The above described procedures result in a lot of PIM states in the routers including those that are not in the actual converged path, e.g., shortest path tree 36, of the multicast traffic. Due to redundant trees 34, 36, PIM relies on data-driven events to converge to a single tree, e.g., shortest path tree 36. These data-driven events are costly implementation-wise and have a direct negative impact on scaling capabilities.

Figure 3:
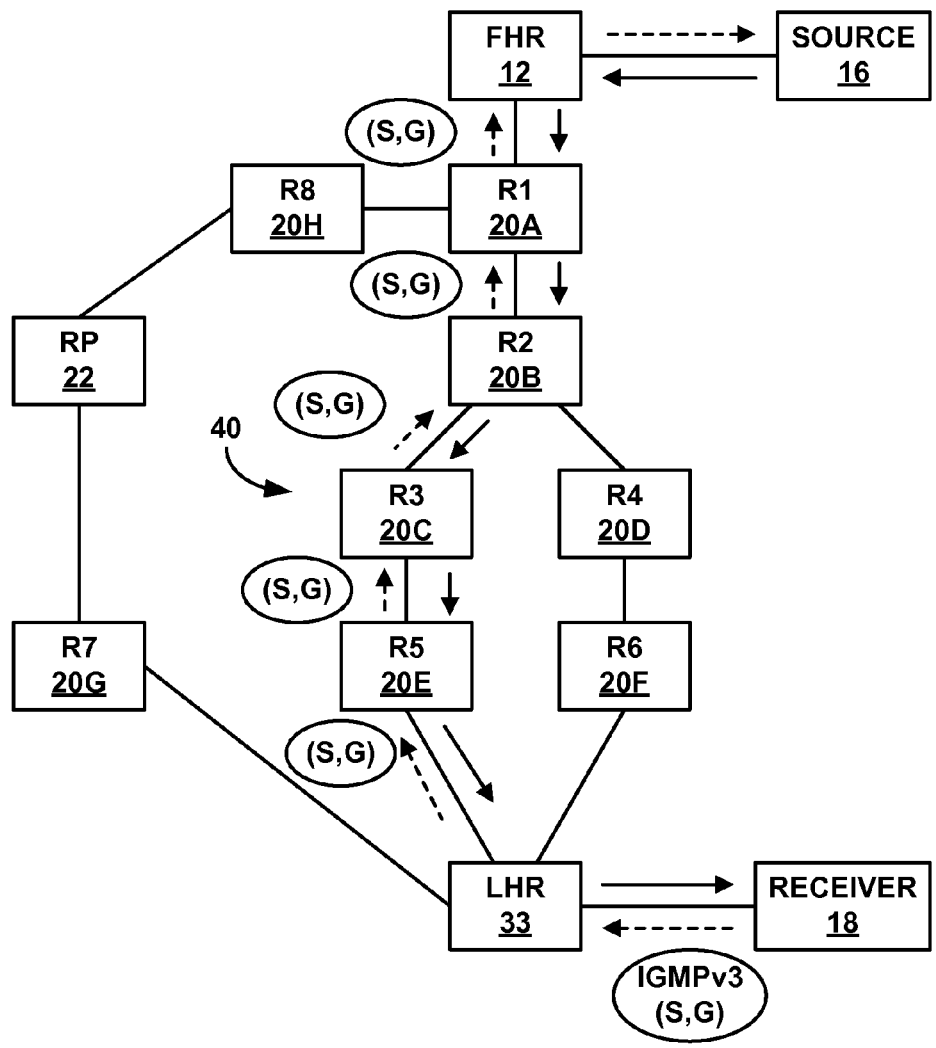
FIG. 3 is a block diagram illustrating a source tree established by a last hop router according PIM Source-Specific Multicast (SSM) mode to transmit multicast traffic between a source and a receiver.

FIG. 3 is a block diagram illustrating a source tree 40 established by a last hop router (LHR) 33 according PIM Source-Specific Multicast (SSM) mode to transmit multicast traffic between source 16 and receiver 18. LHR 33 illustrated in FIG. 3 is configured to build multicast distribution trees according to the PIM SSM mode. In FIG. 3, the dashed arrows indicate PIM Join messages sent towards source 12, and the solid arrows indicate multicast traffic being forwarded over source tree 40 towards receiver 18. Source tree 40 may comprise a multicast distribution tree established along a shortest path between LHR 33 connected to receiver 18 and FHR 12 connected to source 16.

The PIM SSM mode, which is described in more detail in RFC 4607 cited above, describes a mechanism to avoid the state explosion problem encountered in PIM ASM mode. This is accomplished by Internet Group Management Protocol, version 3 (IGMPv3) capable hosts that have knowledge via offline programming about the sources that are sending traffic for given multicast groups. As an example, source 16 and receiver 18 may be IGMP hosts. The information about the sources is then carried in IGMPv3 reports from the IGMP hosts to adjacent routers, e.g., FHR 12 and LHR 33. By virtue of this, LHR 33 can directly build or join source tree 40 to source 16, without first building or joining a shared tree to RP 22.

As illustrated in FIG. 3, receiver 18, operating as an IGMP host receiver, already knows about source 16 and the multicast groups for which source 16 is sending traffic, and sends an IGMPv3 report with the (S,G) information to LHR 33. LHR 33 receives the IGMPv3 report and initiates establishment of source tree 40 by sending out (S,G) PIM Join messages for the source and the given multicast group towards source 16 along the shortest path, e.g., via R5 20E, R3 20C, R2 20B, R1 20A and FHR 12. Upon receiving the (S,G) PIM Join messages, FHR 12 sends the multicast traffic for the given multicast group from source 16 over source tree 40 to LHR 33 and then to receiver 18.

In the example of the PIM SSM mode, LHR 33 has no need to send (*,G) PIM Join messages and subsequent (S,G,RPT_Prune) PIM Prune messages towards RP 22 to build and then prune a shared tree. In fact, there is no need for RP 22 in the network at all. If all the IGMP Hosts in the network know the source information for the multicast groups in which they are interested, the PIM SSM mode can be used and the state explosion/data-driven events in the PIM ASM mode can be avoided.

The PIM SSM mode, however, poses a practical difficulty in pre-learning the sources and associated multicast groups, and configuring or programming the source information on the IGMP hosts (e.g., TV remotes). Because of this limitation, real-world PIM deployments have by far remained in the PIM ASM mode with its problems of states and reliance on data-driven events.

As described in more detail with respect to FIGS. 4-8 below, this disclosure describes an approach in which the LHR discovers the source in a particular way and, thereby, directly builds only "shortest-path-trees" to the source. According to the techniques of this disclosure, the LHR builds a communication channel with a RP router and requests source information for at least one multicast group for which the LHR has interested receivers. The RP responds to the request by looking into a register database maintained by the RP and sending source information indicating at least one source that is actively providing traffic for the at least one multicast group. Based on the response, the LHR initiates a (S,G) PIM Join message toward the at least one source for the at least one multicast group to directly build or join at least one source tree. The techniques avoid the issues of state explosion and data driven events encountered in the PIM ASM mode. The techniques also avoid the practical difficulty of pre-learning source information and configuring hosts with the source information encountered in the PIM SSM mode.

Figure 4:
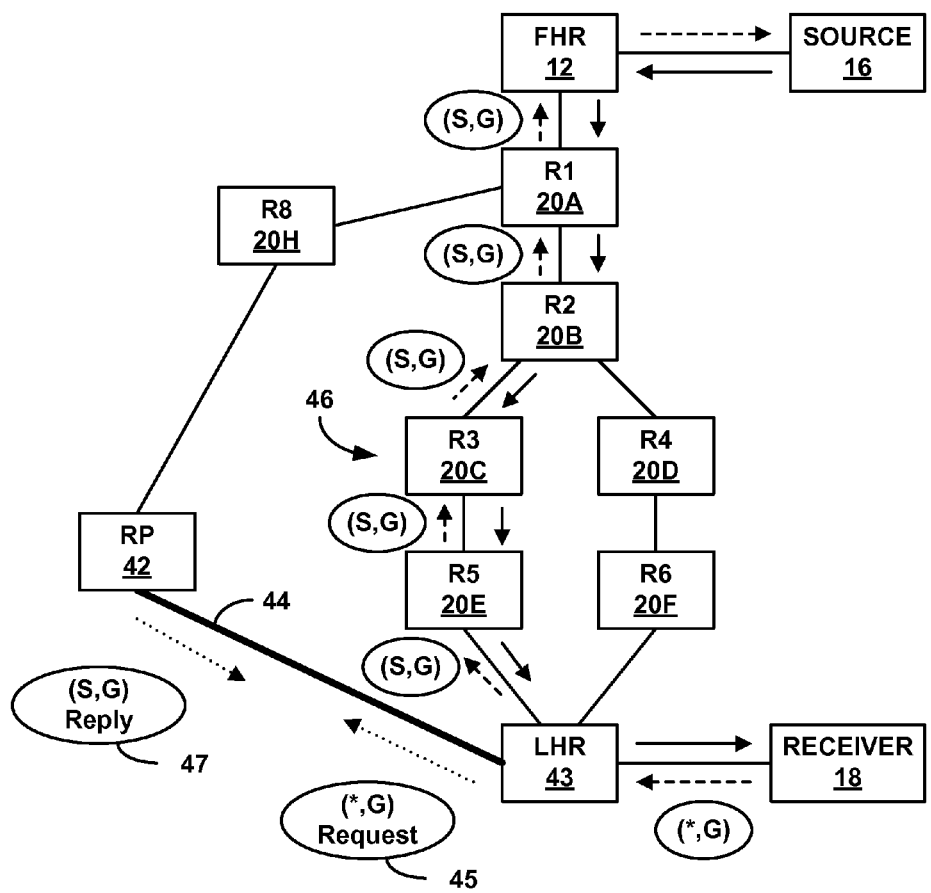
FIG. 4 is a block diagram illustrating a source tree established using PIM source discovery by a last hop router (LHR), in accordance with techniques of this disclosure.

FIG. 4 is a block diagram illustrating a source tree 46 established using PIM source discovery by a last hop router (LHR) 43, in accordance with techniques of this disclosure. LHR 43 illustrated in FIG. 4 is configured to establish a communication channel 44 with RP 42 in order to receive source information for multicast groups in which receiver 18 has interest, and build multicast distribution trees directly to source 16 based on the source information. In FIG. 4, the dotted arrows along communication channel 44 indicate source information messages exchanged over communication channel 44 between LHR 43 and RP 42. In addition, in FIG. 4, the dashed arrows along source tree 46 indicate PIM Join messages sent towards source 16 based on the source information, and the solid arrows along source tree 46 indicate multicast traffic being forwarded over source tree 46 towards receiver 18. Source tree 46 may comprise a multicast distribution tree established along a shortest path between LHR 43 connected to receiver 18 and FHR 12 connected to source 16.

To solve the problem of states-explosion and data-driven events encountered in the PIM ASM mode, the techniques described in this disclosure enable LHR 43 to learn source-active information from a central router, e.g., RP 42. A separate communication channel 44 is established between LHR 43 and RP 42. In one example, this disclosure describes that communication channel 44 may be a PIM reliable transport connection. The PIM reliable transport connection, however, is just one of the approaches for separate communication channel 44 between RP 42 and LHR 44. Another example of communication channel 44 includes User Datagram Protocol (UDP) register messages exchanged between RP 42 and LHR 44 similar to unicast PIM register messages exchanged between RP 22 and FHR 12 as described in FIGS. 2A and 2B above. An additional example of communication channel 44 includes a particular multicast tree using a special group address to broadcast multicast session information similar to the Session Announcement Protocol (SAP). A further example of communication channel 44 includes using a PIM Dense Mode (DM) group-based approach used to flood source information messages similar to what is used in Auto-RP.

This disclosure primarily describes separate communication channel 44 as a PIM reliable transport connection. The disclosed techniques, however, should not be limited solely to the reliable transport approach as similar techniques may be applied to the UDP register messages, the particular multicast tree using the special group address, and the PIM DM group-based mechanisms discussed above.

The reliable transport approach is described in more detail in A. Peter, et al., "Reliable Transport For PIM Register States," Internet Engineering Task Force (IETF), Protocol Independent Multicast (PIM) working group, Internet-Draft, draft-anish-reliable-pim-registers-00, Mar. 9, 2015 (hereinafter "draft-anish"), the entire content of which is incorporated herein by reference. The draft-anish defines procedures to create a reliable transport connection between a FHR and the RP using PIM targeted hello messages. The draft-anish also defines a method to reliably send register state to the RP using the PIM over Reliable Transport (PORT) protocol. The PORT protocol is further described in Farinacci et al., "A Reliable Transport Mechanism for PIM," IETF RFC 6559, March 2012 (hereinafter "RFC 6559"), the entire content of which is incorporated herein by reference. In general, the draft-anish describes a method to distribute the source-active/register information reliably through the PIM network.

According to the techniques of this disclosure, the reliable transport approach described in the draft-anish may be extended to create a PIM reliable transport connection 44 between RP 42 and LHR 43, and to exchange request and response messages for source information between LHR 43 and RP 42. Once LHR 43 learns source information for a given multicast group in which it is interested (e.g., an address of at least one source actively providing traffic for the given multicast group), LHR 43 will send (S,G) Join messages towards the source, e.g., source 16, and be able to receive traffic for the multicast group over source tree 46. As illustrated in FIG. 4, the techniques of this disclosure do not have any need for "shared trees" or "pruning the shared tree for the source tree," as in the PIM ASM mode described with respect to FIGS. 2A and 2B. This will have direct positive implications on scaling, convergence, reduction in complexity, and trouble-shooting. The techniques described in this disclosure may be referred to as PIM source discovery by the last hop router. How PIM source discovery may be accomplished is described in further detail below.

The illustrated example of FIG. 4 is a simple representation of PIM source discovery by the last hop router using PIM reliable transport based communication channel 44 between LHR 43 and RP 42. First, LHR 43 builds a reliable transport connection 44 with RP 42. Second, LHR 43 sends a receiver-active message requesting the source information for the multicast groups in which receiver 18 is interested, e.g., LHR 43 sends a (*,G) request to RP 42 for source information about group G. Third, RP 42 responds with a source-active-response message that includes the source information for the multicast groups in which LHR 43 is interested by looking into a register database maintained by RP 42, e.g., RP 42 sends a (S,G) reply to LHR 43 indicating source S for group G. Fourth, based on the response, LHR 43 initiates a (S,G) Join message directly toward the source, e.g., source 16, indicated as actively providing traffic for group G, thereby building source tree 46 directly without need for a shared tree or shared tree pruning for a source tree. In some examples, there may be multiple sources that are actively sending traffic for the group G. In that case, RP 42 may send multiple (S,G) pairs in response to the source information request for group G from LHR 43. LHR 43 may then join each of the (S,G) pairs and build or join a source tree directly to each of the sources.

The receiver-active message sent by LHR 43 may indicate interest in one or more multicast groups by including a single group address, a group address range, or an indicator that LHR 43 is interested in all the group addresses in the register database maintained by RP 42. RP 42 responds back to LHR 43 with the source-active-response message including a list of addresses for sources that are actively providing traffic for the multicast groups indicated in the receiver-active message. Unless a "one-time" flag is set, RP 42 retains LHR 43 in a list of LHRs that have interested receivers for the indicated multicast groups in the register database in order to notify LHR 43 about incremental changes happening to the active sources for the indicated multicast groups. When LHR 43 is no longer interested in the indicated multicast groups, LHR 43 may send the same receiver-active message to RP 42, but with an indication to withdraw LHR 43 from the list of LHRs for the indicated multicast groups in the register database.

Figure 6:
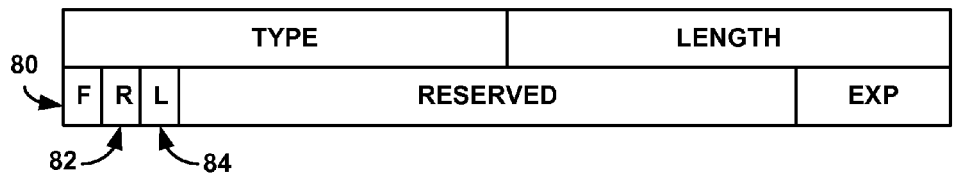
FIG. 6 is a conceptual diagram illustrating an example PIM Targeted hello message.
Figure 7:
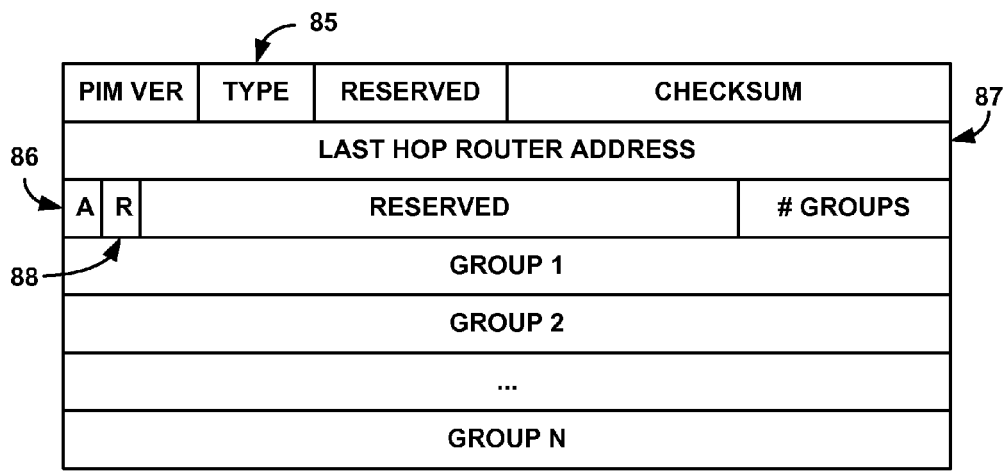
FIG. 7 is a conceptual diagram illustrating an example packet format of a receiver-active message sent from a LHR to a rendezvous point (RP), in accordance with techniques of this disclosure.
Figure 8:
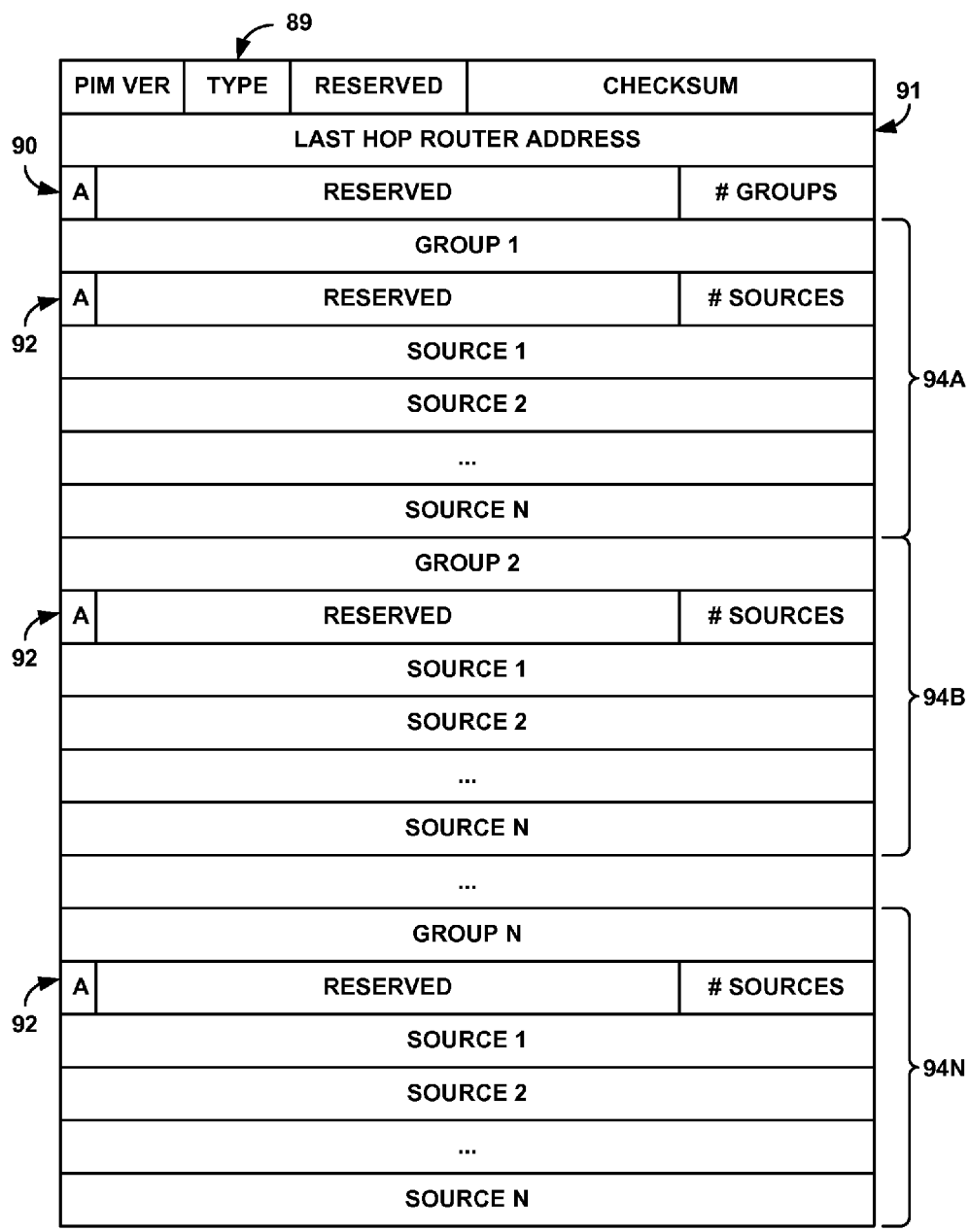
FIG. 8 is a conceptual diagram illustrating an example packet format of a source-active-response message sent from the RP to the LHR in response to the receiver-active message from FIG. 7, in accordance with techniques of this disclosure.
Figure 9:
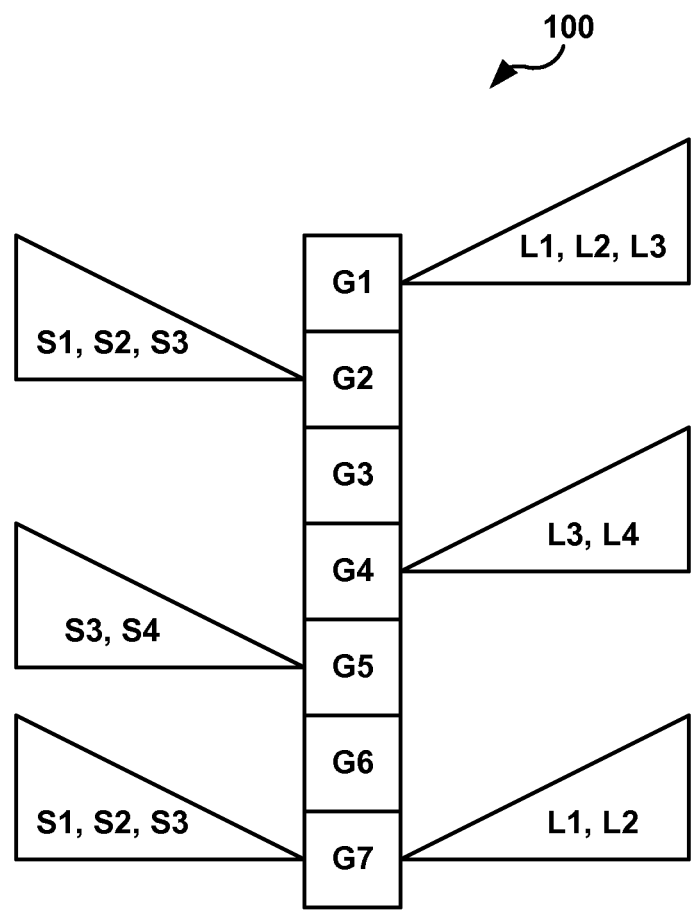
FIG. 9 is a conceptual diagram illustrating an example register database maintained by a RP that tracks multicast groups, sources that are active for the multicast groups, and LHRs that have expressed interest in the multicast groups.

This disclosure provides further details of PIM source discovery by the last hop router with respect to FIGS. 6-9 below. For example, FIG. 6 illustrates a PIM targeted hello message. FIGS. 7 and 8 illustrate packet formats for requesting the source information and responding to the requests, respectively. In addition, FIG. 9 illustrates the register database maintained by the RP.

Figure 5:
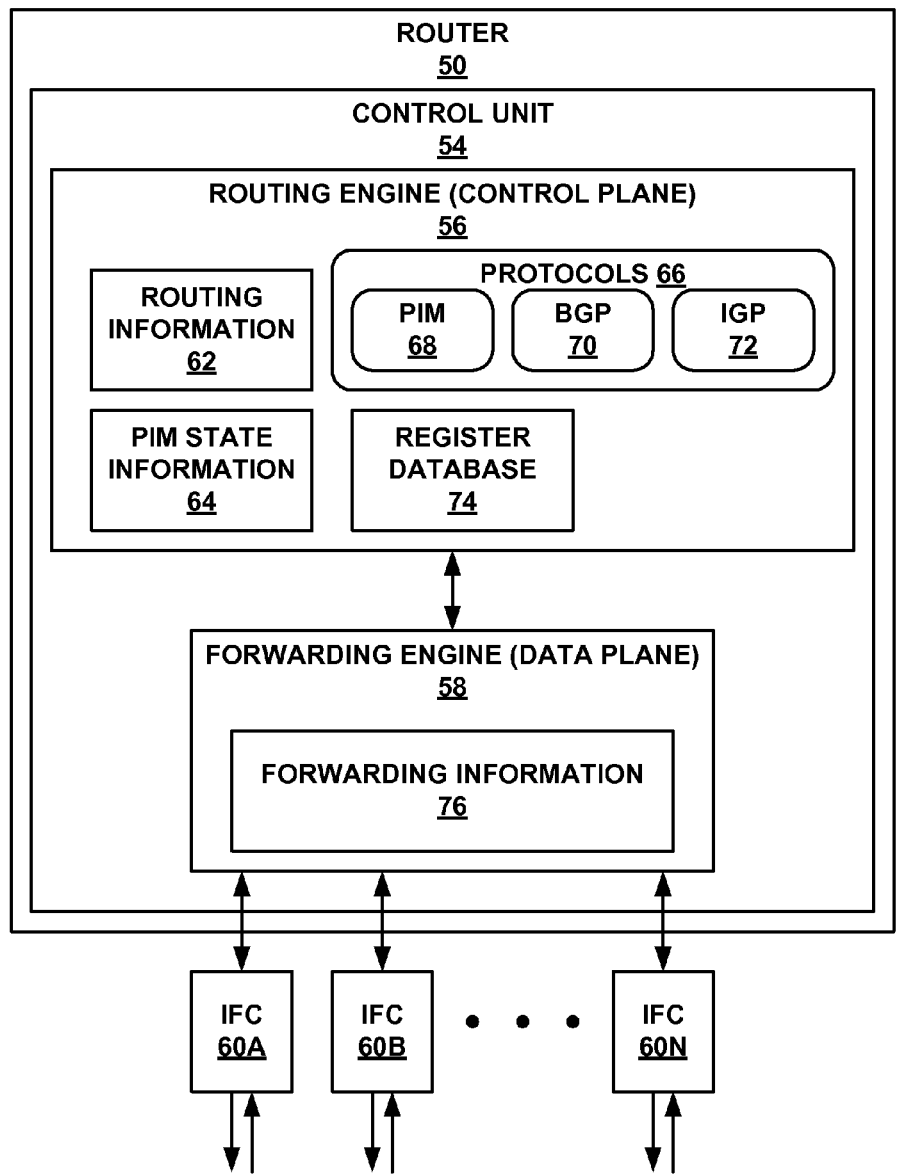
FIG. 5 is a block diagram illustrating an example router capable of performing the disclosed techniques of source discovery by a last hop router.

FIG. 5 is a block diagram illustrating an example router 50 capable of performing the disclosed techniques of PIM source discovery by a last hop router. In one example, router 50 may operate as a last hop router (LHR) configured to establish a communication channel with a rendezvous point (RP) or a controller router and perform source discovery. For example, router 50 may operate substantially similar to LHR 43 from FIG. 4. In other examples, router 50 may operate as a RP or controller router configured to maintain a register database 74 tracking multicast groups, sources that are active for the multicast groups, and LHRs that have expressed interest in the multicast groups, establish a communication channel with a LHR, and provide source information to the LHRs. For example, router 50 may operate substantially similar to RP router 42 from FIG. 4.

In the illustrated example of FIG. 5, router 50 includes interface cards 60A-60N ("IFCs 60") that receive multicast packets via incoming links and send multicast packets via outbound links. IFCs 66 are typically coupled to the incoming links and the outbound links via a number of interface ports. Router 50 also includes a control unit 54 that determines routes of received packets and forwards the packets accordingly via IFCs 66.

Control unit 54 includes a routing engine 56 and a forwarding engine 58. Routing engine 56 operates as the control plane for router 50 and includes an operating system that may provide a multi-tasking operating environment for execution of a number of concurrent processes. For example, routing engine 56 provides an operating environment for various protocols 66 that perform routing functions for router 50. In the illustrated example of FIG. 5, routing engine 56 includes a border gateway protocol (BGP) 70 and an interior gateway protocol (IGP) 72 as unicast routing protocols used to exchange routing information with other routing devices in a network in order to discover the network topology and update routing information 62. In the examples described in this disclosure, IGP 72 may be a link-state routing protocol such as open shortest path first (OSPF) or intermediate system-intermedia system (IS-IS). In addition, routing engine 56 includes PIM 68 as a multicast routing protocol used to build multicast distribution trees with the other routing devices in the network using routing information 62 and PIM state information 64.

Routing information 62 may describe the topology of the network in which router 50 resides, and may also describe various routes within the network and the appropriate next hops for each route, i.e., the neighboring routing devices along each of the routes. Routing information 62 may include a list of incoming interfaces (IIFs) and a list of outgoing interfaces (OIFs) that indicate which of IFCs 60 are connected to the neighboring routing devices in each route. For example, a given route may comprise a multicast route for multicast traffic for a given multicast group. In that example, the list of IIFs included in routing information 62 for router 50 may include a list of upstream interfaces for all upstream routers that have PIM state for the given multicast group.

PIM state information 64 may describe a current status of links to the neighboring routing devices in the multicast distribution trees established using PIM 68. For example, PIM state information 64 may include PIM join states that describe which neighboring routing devices belong to which multicast groups within the range for a given multicast distribution tree. Routing engine 56 analyzes stored routing information 62 and PIM state information 64 to generate forwarding information 76 installed in forwarding engine 58.

Forwarding engine 58 provides data plane functionality for router 50. Although not shown in FIG. 5, forwarding engine 58 may comprise a central processing unit (CPU), memory and one or more programmable packet-forwarding application-specific integrated circuits (ASICs). Forwarding information 76 associates network destinations with specific next hops and corresponding ports of IFCs 60.

In accordance with the techniques of this disclosure, when router 50 operates as a LHR, routing engine 56 may be configured to establish a communication channel directly to a RP or controller router in order to request source information from the RP or controller router. In one example, routing engine 56 may execute PIM 68 to establish a reliable transport connection to the RP. Routing engine 56 may also use PIM 68 to request source information for one or more multicast groups in which router 50 is interested. Upon receipt of the requested source information, routing engine 56 may update PIM state information 64 to include the learned addresses of sources actively providing traffic for the given multicast groups. In this way, routing engine 56 may use PIM 68 to build source trees directly to the active sources for the multicast groups.

In further accordance with the techniques of this disclosure, when router 50 operates as a RP, routing engine 56 may be configured to establish a communication channel directly to a LHR in order to provide source information for specific multicast groups to the LHR. In one example, routing engine 56 may execute PIM 68 to establish a reliable transport connection with reliable transport to the LHR. Routing engine 56 may also use PIM 68 to respond to source information requests from the LHR for one or more multicast groups. Upon receipt of the source information request, routing engine 56 may look into register database 74 to determine which sources are actively providing traffic for the multicast groups. Routing engine 56 may update register database 74 based on different messages received from the LHR via the communication channel and received from a first hop router (FHR) connected to one or more sources.

The architecture of router 50 illustrated in FIG. 5 is shown for exemplary purposes only and should not be limited to this architecture. In other examples, router 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

FIG. 6 is a conceptual diagram illustrating an example PIM targeted hello message. In some examples, the representation of a targeted hello message may be referred to as a type-length-value, or TLV, representation. Targeted hello messages have a unicast address as a destination address, and traverse multiple hops using unicast routing to reach a targeted hello neighbor identified by the destination address. The representation of the targeted hello message illustrated in FIG. 6 is merely one example format. In other examples, different representations may be used for a targeted hello message used to establish a targeted neighborship between two routers that are not directly connected.

The draft-anish, cited above, describes PIM targeted hello messages between a first hop router (FHR) and a RP router for purposes of reliable register maintenance at the RP router. In this disclosure, the described techniques extend the PIM targeted hello messages to apply between the RP router and a LHR for purposes of source discovery by the LHR. For example, the extended PIM targeted hello messages include a new bit that enables a router to identify itself as a LHR.

As illustrated in the example of FIG. 6, a targeted hello message may include a Type field with a value that specifies the message type as a targeted hello message (e.g., a value of 36 may specify a targeted hello message type). The Length field has a value that specifies the combined byte length of all the fields in the targeted hello message. The illustrated representation includes an "F" bit 80 that indicates whether a sender of the targeted hello message is capable of being a FHR. For example, when bit 80 is set it may indicate that the sender is capable of being a FHR; otherwise the sender is not a FHR. The illustrated representation also includes an "R" bit 82 that indicates whether the sender of the targeted hello message is capable of being an RP. For example, when bit 82 is set it may indicate that the sender is capable of being an RP; otherwise the sender is not an RP. In accordance with the disclosed techniques, the illustrated representation includes an "L" bit 84 that indicates whether the sender of the targeted hello message is capable of being a LHR. For example, when bit 84 is set it may indicate that the sender is capable of being a LHR; otherwise the sender is not a LHR.

A reliable transport connection may be setup between the LHR and the RP to support reliable messaging. Once the LHR and the RP discover each other as PIM targeted neighbors using the PIM targeted hello messages, the LHR may take the active role and establish a PIM reliable transport connection with the RP. For example, the LHR may listen for the RP to connect once it forms the targeted neighborship with the RP. The RP is expected to use its primary address, which it would have used as the source address in its PIM targeted hello messages.

In general, PIM may use anycast-RP as a mechanism for RP redundancy. In the event of a nearest anycast-RP changing over to a different router, the LHR may detect the change when it starts receiving PIM targeted hello messages with a different primary address for the same anycast address. Upon detecting this scenario, the LHR may wait for an interval of time before setting up a reliable transport connection with the newly found primary address of the RP. After establishing the reliable transport connection, the LHR transmits its PIM states to the new peer. Subsequently, the older reliable transport connection is terminated due to neighbor timeout. Once the old connection is terminated, the LHR may clear off the PIM states for the sources that were advertised in the old connection but not in the new connection. In order to accommodate delays in a new RP discovering and advertising a source, the PIM state cleanup should be done only after a suitable delay. The receiver-active message from the LHR should not be mirrored to the other anycast-RP peers as it is sufficient for the receiver-active message to rest with the nearest RP.

FIG. 7 is a conceptual diagram illustrating an example packet format of a receiver-active message sent from a LHR to a RP. The receiver-active message indicates one or more multicast groups in which the LHR has interested receivers, and requests source information for those multicast groups. The packet format of the receiver-active message illustrated in FIG. 7 is merely one example format. In other examples, different packet formats may be used for a receiver-active message used to request source information for multicast groups in which a LHR is interested.

The illustrated format includes a new PIM Type 85 to indicate that the message is a receiver-active message, and a last hop router address 87 of the LHR sending the receiver-active message. As illustrated, the receiver-active message may provide individual addresses for each multicast group in which the LHR is interested (e.g., Group 1, Group 2 . . . Group N). In other examples, the receiver-active message may instead or additionally provide a prefix-range of addresses for groups in which the LHR is interested, e.g., 225.1/16.

The illustrated format includes an "A" bit 86 that indicates whether the LHR is interested in being added to or withdrawn from a list of LHRs that have interested receivers for the listed multicast groups in a register database maintained by the RP. For example, when bit 86 is set it may indicate a request for the LHR to be added to the list of LHRs interested in the listed multicast groups; otherwise the request is to withdraw the LHR from the list of LHRs interested in the listed multicast groups. In some examples, the receiver-active message may include a first request to add the LHR to a first list of multicast groups, and a second request to withdraw the LHR from a second list of multicast groups.

The illustrated format also includes an "R" bit 88 that indicates whether the LHR is requesting source information of the entire register database maintained by the RP. For example, when bit 88 is set, the LHR is expressing interest in all multicast groups and all active sources included in the register database, and may not send a listing of multicast group addresses in the receiver-active message.

FIG. 8 is a conceptual diagram illustrating an example packet format of a source-active-response message sent from the RP to the LHR in response to the receiver-active message from FIG. 7. The source-active-response message indicates one or more active sources for each multicast group in which the LHR expressed interested in the receiver-active message. The packet format of the source-active-response message illustrated in FIG. 8 is merely one example format. In other examples, different packet formats may be used for a source-active-response message used to provide source information for multicast groups in which a LHR is interested.

The illustrated format includes a new PIM Type 89 to indicate that the message is a source-active-response message, and a last hop router address 91 identifying the LHR to which the RP is sending the source-active-response message. As illustrated, the source-active-response message may provide individual addresses for each source that is actively providing traffic for each multicast group in which the LHR expressed interested (e.g., for Source 1, Source 2 . . . Source N for Group 1 94A; Source 1, Source 2 . . . Source N for Group 2 94B, and Source 1, Source 2 . . . Source N for Group N 94N).

The illustrated format includes an "A" bit 90 that indicates whether all of the listed sources for the respective multicast groups have been be added to or withdrawn from a list of sources that are actively providing traffic for the multicast groups included in a register database maintained by the RP. For example, when bit 90 is set it may indicate that all the listed sources have been added to the list of active sources for the respective multicast groups, otherwise all the listed sources have been withdrawn from the list of active sources for the respective multicast groups. Bit 90 may be useful in the case where the LHR has requested source information of the entire register database maintained by the RP.

The illustrated format also includes an "A" bit 92 for each multicast group in which the LHR expressed interest that indicates whether the list of sources for the respective multicast group has been added to or withdrawn from a list of sources that are actively providing traffic for the respective multicast group included the register database maintained by the RP. For example, when bit 92 for Group 1 94A is set it may indicate that the listed sources have been added to the list of active sources for Group 1, otherwise the listed sources have been withdrawn from the list of active sources for Group 1. In some examples, for each multicast group in which the LHR expressed interest, the source-active-response message may include a first list of active sources added for the respective multicast group, and a second list of previously active sources withdrawn from the respective multicast group.

Traditionally with PIM-SM, the LHR had the responsibility of checking the sources for liveness (i.e., whether the source is still actively providing traffic for a given multicast group), so that the LHR could prune traffic on the source tree from sources that were no longer active. According to the techniques described in this disclosure, this liveness monitoring may be avoided on the LHR. The LHR may instead prune traffic on the source tree based on receiving a withdraw indication for the stream in the source-active-response message.

FIG. 9 is a conceptual diagram illustrating an example register database 100 maintained by a RP that tracks multicast groups, sources that are active for the multicast groups, and LHRs that have expressed interest in the multicast groups. In some examples, register database 100 may be substantially similar to register database 74 in router 50 from FIG. 5. The disclosed techniques for source discovery by a LHR include tracking sources, multicast groups, and LHRs by the RP in register database 100. This tracking is necessary because active sources and interested LHRs can come up (or down) at different times. In a simple case, the LHR asks the RP about all the sources that are active for all the multicast groups. This will result, however, in the LHR maintaining information for all the multicast flows, even those in which the LHR is not interested. In addition, if new sources come up later, the RP has to specifically update the LHR with the new information. To address such situations, this disclosure describes procedures performed by the RP to effectively manage the information and also keep the PIM states up to date.

According to the disclosed techniques, the RP maintains register database ("RP-dB") 100 to track the multicast groups, the sources that are active for the particular multicast groups, and the LHRs that have expressed interest in the particular groups. In this way, the RP can track the PIM states and update the LHRs accordingly with the latest source information. Examples are provided below of different triggers that can occur at the RP and the corresponding actions that the RP needs to take to update RP-dB 100 and ensure that the PIM states are in sync between the sources, the RP and the LHRs.

For representation purposes, the list of sources is represented as: S1, S2, S3 . . . Sn, the list of groups is represented as G1, G2, G3 . . . Gn, and the list of LHRs is represented as L1, L2, L3 . . . Ln. As illustrated in FIG. 9, RP-dB 100 includes a list of multicast groups G1-G7. For G1, RP-dB 100 includes a list of LHRs L1, L2, L3 that have interested receivers for G1. For G2, RP-dB 100 includes a list of sources S1, S2, S3 that are actively providing traffic for G2. For G4, RP-dB 100 includes a list of LHRs L3, L4 that have interested receivers for G4. For G5, RP-dB 100 includes a list of sources S3, S4 that have interested receivers for G5. For G7, RP-dB 100 includes a list of sources S1, S2, S3 that are actively providing traffic for G7 and a list of LHRs L1, L2 that have interested receivers for G7.

The different triggers are represented as T1, T2, T3 . . . Tn, and the actions taken by the RP based on the triggers are represented as A1, A2, A3 . . . An. The example triggers at the RP may include the following:

T1: (RA-G) Receiver-Active message for group G from LHR-ADD
T2: (S,G) Register message from FHR-ADD
T3: (RA-*) Request message from LHR for entire RP-dB-ADD
T4: (RA-G) Receiver-Active message for group G from LHR-WITHDRAW
T5: (S,G) Register message from FHR-WITHDRAW
T6: (RA-*) Request message from LHR for entire RP-dB-WITHDRAW The example actions taken by the RP may include the following:

A1=Add Group G in RP-dB (if not already existing in RP-dB)
A2=Add Source S in RP-dB's Source list for particular group G
A3=Add LHR L in the RP-dB's LHR list for particular group G
A4=Remove Group G from RP-dB if G's Source List and LHR list are empty A5=Remove Source S from RP-dB for a particular group G A6=Remove LHR L from RP-dB for a particular group G A7=For group G, walk the list of Sources in the G's Source List,
For each Source S in the Source List, Send (S,G) to the LHR L-ADD A8=For group G, walk the list of Sources in the G's Source List,
For each Source S in the Source list, Send (S,G) to the LHR L-WITHDRAW A9=For group G, walk the list of LHRs in the G's LHR list,
For each LHR L in the LHR list, Send (S,G) to the LHR L-ADD A10=For group G, walk the list of LHRs in the G's LHR list,
For each LHR L in the LHR list, Send (S,G) to the LHR L-WITHDRAW Having defined some example triggers and actions above, the different triggers that may occur at the RP and the corresponding actions that may be taken by the RP are listed below.

T1=>A1+A3+A7
T2=>A1+A2+A9
T4=>A8+A6+A4
T5=>A10+A5+A4
T3=>Repeat T1 for all groups G in RP-dB
T6=>Repeat T4 for all groups G in RP-dB The two example triggers T1 and T2 at the RP and the subsequent example actions taken by the RP are described below in detail with respect to RP-dB 100. The other triggers and actions can be similarly worked out and understood.

In one example, trigger T1 occurs when the RP receives a receiver-active message for a group G (RA-G) from a LHR L. The RP populates the group G in RP-dB 100 to enable future tracking. The RP, therefore, performs action A1, which is to add the group in the RP-dB table 100. Then the RP performs action A3 in order to track the LHR L and update LHR L with any future changes to the PIM state. According to action A3, the RP adds the LHR L to the list of LHRs interested in group G. The RP then determines if there are sources active for the group G. RP, therefore, performs action A7 in which the RP walks the list of sources in the RP-dB 100 and, for each source that is active for the group G, the RP sends out a (S,G) entry to the LHR L. In this way, the LHR discovers the sources that are active for the group G.

In another example, trigger T2 occurs when the RP receives a (S,G) register message from an FHR. The RP populates the group G in RP-dB 100 to enable future tracking. The RP, therefore, performs action A1, which is to add the group in the RP-dB 100. Then the RP performs action A2 in order to track the source S for the group G so that if any new LHRs come up later, the RP will be able to update the new LHRs with the source information. According to action A2, the RP adds the source S to the list of active sources for the group G. The RP then performs action A9 in which the RP determines the list of LHRs that are interested in the group G and sends out the (S,G) source-active information to each of the LHRs in the list of LHRs interested in group G.

The above descriptions of example triggers T1 and T2 explain how a source or LHR coming up may be handled comprehensively by the RP. Similarly, a source or LHR going down may be handled according to example triggers T4 and T5 and their respective example actions. In the case where the LHR has requested the entirety of RP-dB 100, sources or LHRs coming up may be handled according to example trigger T3, and sources or LHRs going down may be handled according to example trigger T6. In this way, the RP keeps its PIM state in sync with the network and it updates the LHRs with the latest source information in a reliable and swift manner.

The techniques described in this disclosure may provide several advantages. For example, according to the techniques, there is no need to build shared-trees for a group, and there is no need for (S,G,RPT_Prune) states and messages on the network, which usually increase complexity in PIM networks especially those with LAN enabled interfaces. In this way, the states and messages will be considerably reduced not only on the LHR but on all relevant PIM routers in the network.

The feasibility of the techniques is also fairly straightforward. With the disclosed techniques, the reliance on data-driven events may be avoided. In addition, there is no need to build a tree from the RP to the FHR, thereby effectively reducing states on the routers in the path between the RP and the FHR. The disclosed techniques provide PIM SSM mode like behavior and reach very good scaling numbers, but does not enforce pre-learning of sources on IGMP hosts. Instead, the sources are learned dynamically by the networks themselves. With reliable register (PORT) usage there is some need for periodic refresh of the RP-dB information, but no need for multiple acknowledgments of receipt messages. In LAN scenarios including Rosen MVPN, the states and complexity that are created with the PIM ASM mode described in RFC 4601, cited above, are simplified with the disclosed techniques.

The PIM ASM mode described in RFC 4601, cited above, specifies formation of multiple trees and involves lot of states and complexity. The techniques described in this disclosure provides a differentiator in that it brings in the advantages of PIM SSM mode while avoiding the limitations associated with PIM SSM mode, thereby providing an effective and scalable multicast solution.

An alternative method that may be used to learn source information without the need for shared trees uses a PIM flooding mechanism modeled after the PIM Bootstrap Router (BSR) protocol. This method, referred to hereinafter as "Source-BSR," is described in Wijnands, et al., "PIM flooding mechanism and source discovery," Internet Engineering Task Force (IETF), Network Working Group, Internet-Draft, draft-ietf-pim-source-discovery-bsr-01, Jul. 3, 2014. The techniques described in this disclosure, however, have several advantages over Source-BSR.

In addition to the advantages described above, the reliable transport approach between the LHR and the RP, as described in this disclosure, has additional advantages over Source-BSR. For example, the disclosed techniques require no flooding of information containing the (S,G) pars, as is the case with Source-BSR. With the reliable transport approach described in this disclosure, the implementation changes are only done on the LHR and the RP. On the other hand, in the case of Source-BSR, all routers in the network have to participate in the discovery process and all the routers have to be upgraded with the new implementation. The disclosed techniques are also backward-compatible with routers that are not running the new implementation. The disclosed techniques may help in cases of PIM-free core needing ASM support. Moreover, by using the reliable transport connection for source discovery, the RP can grow to a high scale due to hard state. Therefore, the need for multiple RPs for load balancing purposes that exists today might not be needed anymore.

Figure 10:
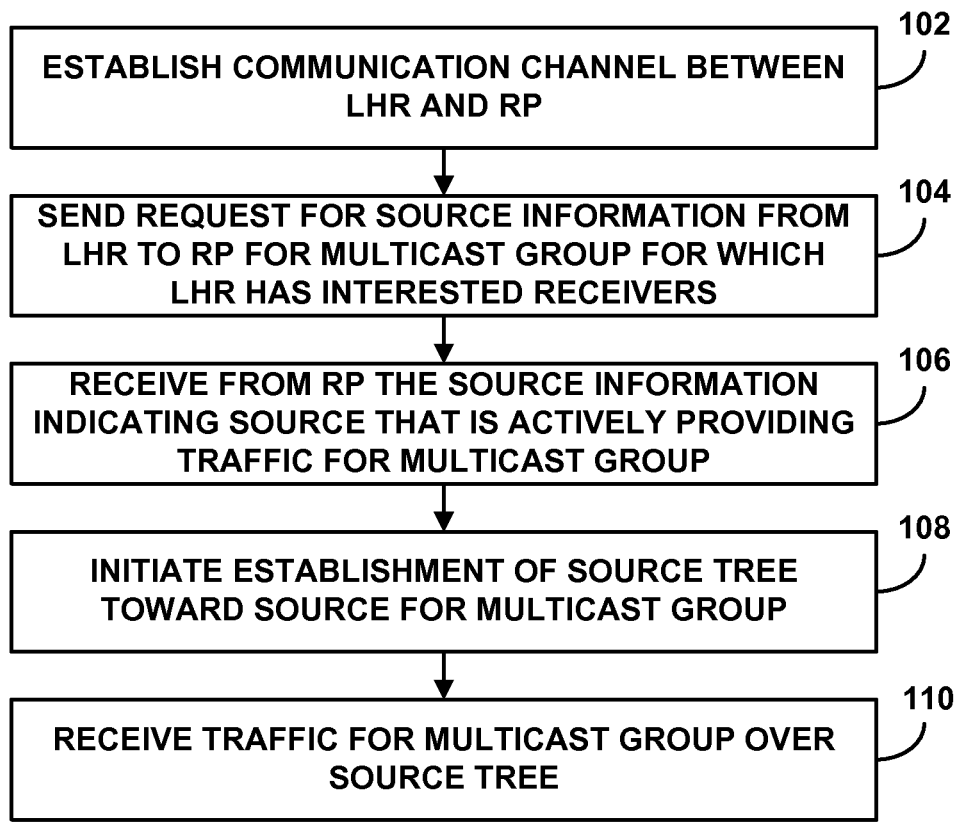
FIG. 10 is a flowchart illustrating an example operation of a LHR performing source discovery in accordance with techniques of this disclosure.

FIG. 10 is a flowchart illustrating an example operation of a LHR performing source discovery in accordance with techniques of this disclosure. The example operation of FIG. 10 is described with respect to LHR 43 from FIG. 4. The example operation of FIG. 10 may also be performed by router 50 from FIG. 5 when operating as a LHR.

LHR 43 establishes a communication channel 44 with RP router 44 (102). As described in more detail above, communication channel 44 may be a PIM reliable transport connection established between LHR 43 and RP router 42. For example, LHR 43 may establish the PIM reliable transport connection by sending a PIM targeted hello message that identifies the sender (i.e., LHR 43) as a LHR to RP router 42. In response, LHR 43 receives a PIM targeted hello message from RP router 42 that identifies the sender (i.e., RP router 42) as an RP. Once LHR 43 and RP router 42 discover each other as PIM targeted neighbors using the PIM targeted hello messages, LHR 43 may then take the active role and establish the PIM reliable transport connection with RP router 42. In other examples, communication channel 44 may be one of User Datagram Protocol (UDP) register messages exchanged between LHR 43 and RP router 42, a multicast tree that uses a special group address to broadcast multicast session information, or a PIM Dense Mode (DM) group-based approach used to flood source information messages.

LHR 43 then sends a request, e.g., (*,G) request, to RP router 42 via communication channel 44 for source information for at least one multicast group for which the LHR has interested receivers, e.g., receiver 18 (104). In response, LHR 43 receives from RP router 42 via communication channel 44 the source information indicating at least one source, e.g., source 16, that is actively providing traffic for the at least one multicast group (106).

In one example, LHR 43 may send a PIM receiver-active message requesting source information for all multicast groups included in a register database, e.g., register database 100 from FIG. 9, maintained by RP router 42. As described with respect to FIG. 7, the PIM receiver-active message may include a bit that indicates whether LHR 43 is requesting source information of the entire register database maintained by RP router 42. In the case where the bit is set in the PIM receiver-active message, LHR 44 may receive a PIM source-active-response message from RP router 42 indicating addresses of all sources that are actively providing traffic for all multicast groups included in the register database. As described with respect to FIG. 8, the PIM source-active-response message may include addresses for each source that is actively providing traffic for each multicast group included in the register database.

In another example, LHR 43 may send a PIM receiver-active message requesting source information for an address of a given multicast group or a prefix-range of addresses that includes the given multicast group. As described with respect to FIG. 7, in the case where the entire register database is not requested, the PIM receiver-active message may include addresses of one or more multicast groups in which LHR 43 is interested. LHR 43 may then receive a PIM source-active-response message from RP router 42 indicating addresses of one or more sources that are actively providing traffic for each of the one or more multicast groups. As described with respect to FIG. 8, the PIM source-active-response message may include addresses for each source that is actively providing traffic for each multicast group in which LHR 43 expressed interest.

A request for source information for a first multicast group sent by LHR 43 to RP router 42 may include a request to add LHR 43 to a list of LHRs that have interested receivers for the first multicast group in the register database maintained by RP router 42. As described with respect to FIG. 7, the PIM receiver-active message may include a bit that indicates whether LHR 43 is interested in being added to one or more multicast groups or withdrawn from one or more multicast groups.

In some cases, the request for source information sent by LHR 43 to RP router 42 may also include a request to add or withdraw LHR 43 from a list of LHRs that have interested receivers for a second multicast group in the register database. In other cases, the additional information may be included in separate messages sent by LHR 43 to RP router 42. In one example, in the case that LHR 43 no longer has interested receivers for the first multicast group, LHR 43 sends a request to RP router 42 to withdraw LHR 43 from the list of LHRs that have interested receivers for the first multicast group in the register database.

In response to the request for source information for the first multicast group, LHR 43 may receive source information from RP router 42 indicating that a first source has been added to a list of sources that are actively providing traffic for the first multicast group in the register database maintained by RP router 42. As described with respect to FIG. 8, the PIM source-active-response message may include a bit for each multicast group in which LHR 43 expressed interest that indicates whether the list of sources have been added to the respective group or withdrawn from the respective group.

In some cases, the source information may also include an indication that a second source has been added or withdrawn from the list of sources that are actively providing traffic for the first multicast group in the register database. In other cases, the source information may further include an indication that the first source has been added or withdrawn from the list of sources that are actively providing traffic for a second multicast group in the register database. In still other cases, the additional information may be included in separate messages received by LHR 43 from RP router 42. In one example, in the case that the first source is no longer actively providing traffic for the first multicast group, LHR 43 receives from RP router 42 an indication that the first source has been withdrawn from the list of sources that are actively providing traffic for the first multicast group in the register database.

Once LHR 43 receives the source information from RP router 42 indicating at least one source, e.g., source 16, that is actively providing traffic for the at least one multicast group, LHR 43 then initiates establishment of at least one source tree, e.g., source tree 46, toward the at least one source, e.g., source 16, for the at least one multicast group (108). Upon establishment of source tree 46, LHR 43 receives the traffic for the at least one multicast group over source tree 46 (110).

Figure 11:
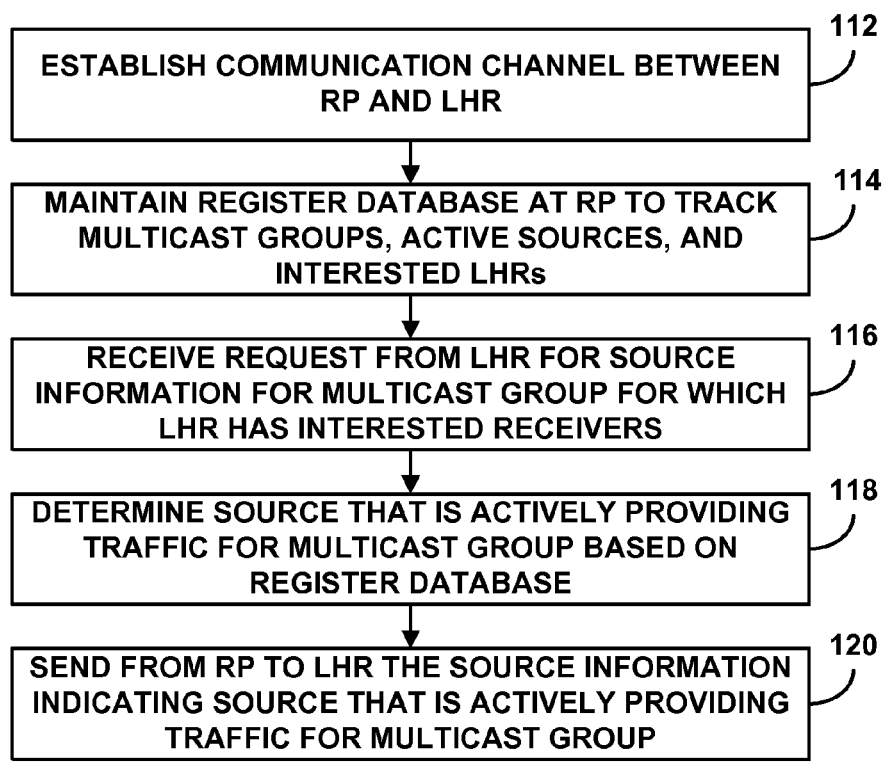
FIG. 11 is a flowchart illustrating an example operation of a RP router during source discovery by a LHR in accordance with techniques of this disclosure.

FIG. 11 is a flowchart illustrating an example operation of a RP router during source discovery by a LHR in accordance with techniques of this disclosure. The example operation of FIG. 11 is described with respect to RP router 42 from FIG. 4. The example operation of FIG. 11 may also be performed by router 50 from FIG. 5 when operating as a RP.

RP router 42 establishes a communication channel 44 with LHR 43 (112). As described in more detail above, communication channel 44 may be a PIM reliable transport connection established between LHR 43 and RP router 42. For example, RP router 42 may receive a PIM targeted hello message from LHR 43 that identifies the sender (i.e., LHR 43) as a LHR. In response, RP router 42 sends a PIM targeted hello message to LHR 43 that identifies the sender (i.e., RP router 42) as an RP. Once LHR 43 and RP router 42 discover each other as targeted PIM neighbors using the PIM targeted hello messages, LHR 43 may then take the active role and establish the PIM reliable transport connection with RP router 42. In other examples, communication channel 44 may be one of User Datagram Protocol (UDP) register messages exchanged between LHR 43 and RP router 42, a multicast tree that uses a special group address to broadcast multicast session information, or a PIM Dense Mode (DM) group-based approach used to flood source information messages.

RP router 42 maintains a register database, e.g., register database 100 from FIG. 9, to track multicast groups, sources that are active for the multicast groups, and LHRs that have expressed interest in the multicast groups (114). RP router 42 may update active sources for the multicast groups included in the register database based on register messages received from a FHR, e.g., FHR 12 from FIG. 4, via a communication channel established between the FHR and RP router 42. Similarly, in accordance with techniques of this disclosure, RP router 42 may update LHRs interested in the multicast groups included in the register database based on register messages received from LHR 43 via communication channel 44.

RP router 42 receives a request from LHR 43 via communication channel 44 for source information for at least one multicast group for which LHR 44 has interested receivers, e.g., receiver 18 (116). RP router 42 determines at least one source that is actively providing traffic for the at least one multicast group based on the register database (118). For example, RP router 42 may perform a lookup in the register database to determine each source in a list of sources that are actively providing traffic for the at least one multicast group in which LHR 43 is interested. RP router 42 then sends to LHR 43 via communication channel 44 the source information indicating the at least one source, e.g., source 16, that is actively providing traffic for the at least one multicast group (120).

In one example, RP router 42 may receive a PIM receiver-active message from LHR 43 requesting source information for all multicast groups included in the register database maintained by RP router 42. As described with respect to FIG. 7, the PIM receiver-active message may include a bit that indicates whether LHR 43 is requesting source information of the entire register database maintained by RP router 42. In the case where the bit is set in the PIM receiver-active message, RP router 42 may send a PIM source-active-response message to LHR 43 indicating addresses of all sources that are actively providing traffic for all multicast groups included in the register database. As described with respect to FIG. 8, the PIM source-active-response message may include addresses for each source that is actively providing traffic for each multicast group included in the register database.

In another example, RP router 42 may receive a PIM receiver-active message from LHR 43 requesting source information for an address of a given multicast group or a prefix-range of addresses that includes the given multicast group. As described with respect to FIG. 7, in the case where the entire register database is not requested, the PIM receiver-active message may include addresses of one or more multicast groups in which LHR 43 is interested. RP router 42 may then send a PIM source-active-response message to LHR 43 indicating addresses of one or more sources that are actively providing traffic for each of the one or more multicast groups. As described with respect to FIG. 8, the PIM source-active-response message may include addresses for each source that is actively providing traffic for each multicast group in which LHR 43 expressed interest.

Upon receiving a request for source information for a first multicast group from LHR 43, RP router 42 may add LHR 43 to a list of LHRs that have interested receivers for the first multicast group in the register database maintained by RP router 42. As described with respect to FIG. 7, the PIM receiver-active message may include a bit that indicates whether LHR 43 is interested in being added to one or more multicast groups or withdrawn from one or more multicast groups.

In some cases, the request for source information received by RP router 42 from LHR may also indicate that LHR 43 either does or does not have interested receivers for a second multicast group, and RP router 42 may then respectively add or withdraw LHR 43 from a list of LHRs that have interested receivers for the second multicast group in the register database. In other cases, the additional information may be included in separate messages received by RP router 42 from LHR 43. In one example, in the case that LHR 43 no longer has interested receivers for the first multicast group, RP router 42 receives a source information request update for the first multicast group, and withdraws LHR 43 from the list of LHRs that have interested receivers for the first multicast group in the register database.

As discussed above, RP router 42 may receive from a FHR, e.g., FHR 12, a register message indicating that a first source is actively providing traffic for the first multicast group, and RP router 42 may add the first source to a list of sources that are actively providing traffic for the first multicast group in the register database maintained by the RP. RP router 42 may then send the source information to LHR 43 indicating that the first source has been added to the list of sources that are actively providing traffic for the first multicast group in the register database. As described with respect to FIG. 8, the PIM source-active-response message may include a bit for each multicast group in which LHR 43 expressed interest that indicates whether the list of sources have been added to the respective group or withdrawn from the respective group.

In some cases, RP router 42 may receive another register message from the FHR indicating that a second source either is or is not actively providing traffic for the first multicast group, and RP router 42 may respectively add or withdraw the first source from a list of sources that are actively providing traffic for the first multicast group in the register database. RP router 42 may then send source information to LHR 43 indicating that the second source has been added or withdrawn from the list of sources that are actively providing traffic for the first multicast group in the register database. In other cases, RP router 42 may receive yet another register message from the FHR indicating that the first source either is or is not actively providing traffic for a second multicast group, and RP router 42 may respectively add or withdraw the first source from a list of sources that are actively providing traffic for the first multicast group in the register database maintained by the RP. RP router 42 may then send source information to LHR 43 indicating that the first source has been added or withdrawn from the list of sources that are actively providing traffic for the second multicast group in the register database.

In one example, upon receiving a register message from the FHR indicating that the first source is no longer actively providing traffic for the first multicast group, RP router 42 withdraws the first source from the list of sources that are actively providing traffic for the first multicast group in the register database maintained by RP router 42. RP router 42 may then send a source information update to LHR 43 indicating that the first source has been withdrawn from the list of sources that are actively providing traffic for the first multicast group in the register database.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:

1. A method comprising:
    establishing, by a last hop router (LHR) in a network, a communication channel with a rendezvous point (RP) router in the network;
    sending, by the LHR to the RP router via the communication channel, a request for source information for at least one multicast group for which the LHR has interested receivers, wherein the request for source information includes a request to the RP router to add the LHR to a list of LHRs that have interested receivers for the at least one multicast group in a register database maintained by the RP router;
    receiving, by the LHR from the RP router via the communication channel, the source information indicating at least one source that is actively providing traffic for the at least one multicast group;
    initiating, by the LHR, establishment of at least one source tree toward the at least one source for the at least one multicast group; and
    upon establishment of the at least one source tree, receiving, by the LHR, the traffic for the at least one multicast group over the at least one source tree.

2. The method of claim 1, wherein the communication channel comprises a Protocol Independent Multicast (PIM) reliable transport connection between the LHR and the RP router, and wherein establishing the communication channel comprises:
    sending, by the LHR to the RP router, a PIM targeted hello message that identifies the LHR; and
    upon receiving a PIM targeted hello message that identifies the RP router from the RP router, establishing, by the LHR, the PIM reliable transport connection with the RP router.

3. The method of claim 1, wherein the communication channel comprises one of:
    User Datagram Protocol (UDP) register messages exchanged between the LHR and the RP router;
    a multicast tree that uses a special group address to broadcast multicast session information; or
    a PIM Dense Mode (DM) group-based approach used to flood source information messages.

4. The method of claim 1,
    wherein sending the request for source information for the at least one multicast group comprises sending a PIM receiver-active message to the RP router requesting source information for all multicast groups included in the register database maintained by the RP router; and
    wherein receiving the source information for the at least one multicast group comprises receiving a PIM source-active-response message from the RP router indicating addresses of all sources that are actively providing traffic for all the multicast groups included in the register database.

5. The method of claim 1,
    wherein sending the request for source information for the at least one multicast group comprises sending a PIM receiver-active message to the RP router requesting source information for an address of the at least one multicast group or a prefix-range of addresses that includes the at least one multicast group; and
    wherein receiving the source information for the at least one multicast group comprises receiving a PIM source-active-response message from the RP router indicating an address of the at least one source that is actively providing traffic for the at least one multicast group.

6. The method of claim 1,
    further comprising, in the case that the LHR no longer has interested receivers for the at least one multicast group, sending a request to the RP router to withdraw the LHR from the list of LHRs that have interested receivers for the at least one multicast group in the register database.

7. The method of claim 1,
    wherein receiving the source information for the at least one multicast group comprises receiving an indication from the RP router that the at least one source has been added to a list of sources that are actively providing traffic for the at least one multicast group in the register database maintained by the RP router; and the method further comprising, in the case that the at least one source is no longer actively providing traffic for the at least one multicast group, receiving an indication from the RP router that the at least one source has been withdrawn from the list of sources that are actively providing traffic for the at least one multicast group in the register database.

8. A network device operating as a last hop router (LHR) in a network, the LHR comprising:

a routing engine configured to establish a communication channel with a rendezvous point (RP) router in the network, send a request to the RP router via the communication channel for source information for at least one multicast group for which the LHR has interested receivers, wherein the request for source information includes a request to the RP router to add the LHR to a list of LHRs that have interested receivers for the at least one multicast group in a register database maintained by the RP router, receive from the RP router via the communication channel the source information indicating at least one source that is actively providing traffic for the at least one multicast group, and initiate establishment of at least one source tree toward the at least one source for the at least one multicast group; and a forwarding engine configured to, upon establishment of the at least one source tree, receive the traffic for the at least one multicast group over the at least one source tree.

9. The network device of claim 8, wherein the communication channel comprises a Protocol Independent Multicast (PIM) reliable transport connection between the LHR and the RP router, and wherein the routing engine is configured to:

send a PIM targeted hello message that identifies the LHR to the RP router; and upon receiving a PIM targeted hello message that identifies the RP router from the RP router, establish the PIM reliable transport connection with the RP router.

10. The network device of claim 8, wherein the communication channel comprises one of:

User Datagram Protocol (UDP) register messages exchanged between the LHR and the RP router;

a multicast tree that uses a special group address to broadcast multicast session information; or a PIM Dense Mode (DM) group-based approach used to flood source information messages.

11. The network device of claim 8, wherein the routing engine is configured to:

send a PIM receiver-active message to the RP router requesting source information for all multicast groups included in the register database maintained by the RP router; and receive a PIM source-active-response message from the RP router indicating addresses of all sources that are actively providing traffic for all the multicast groups included in the register database.

12. The network device of claim 8, wherein the routing engine is configured to:

send a PIM receiver-active message to the RP router requesting source information for an address of the at least one multicast group or a prefix-range of addresses that includes the at least one multicast group; and receive a PIM source-active-response message from the RP router indicating an address of the at least one source that is actively providing traffic for the at least one multicast group.

13. The network device of claim 8, wherein the routing engine is configured to:

in the case that the LHR no longer has interested receivers for the at least one multicast group, send a request to the RP router to withdraw the LHR from the list of LHRs that have interested receivers for the at least one multicast group in the register database.

14. The network device of claim 8, wherein the routing engine is configured to:

receive an indication from the RP router that the at least one source has been added to a list of sources that are actively providing traffic for the at least one multicast group in the register database maintained by the RP router; and in the case that the at least one source is no longer actively providing traffic for the at least one multicast group, receive an indication from the RP router that the at least one source has been withdrawn from the list of sources that are actively providing traffic for the at least one multicast group in the register database.

15. A method comprising:

establishing, by a rendezvous point (RP) router in a network, a communication channel with a last hop router (LHR) in the network;

maintaining, by the RP router, a register database to track multicast groups, sources that are active for the multicast groups, and last hop routers (LHRs) that have expressed interest in the multicast groups;

receiving, by the RP router from the LHR via the communication channel, a request for source information for at least one multicast group for which the LHR has interested receivers;

upon receiving the request for source information, adding, by the RP router, the LHR to a list of LHRs that have interested receivers for the at least one multicast group in the register database maintained by the RP router;

determining, by the RP router, at least one source that is actively providing traffic for the at least one multicast group based on the register database; and sending, by the RP router to the LHR via the communication channel, the source information indicating the at least one source that is actively providing traffic for the at least one multicast group.

16. The method of claim 15, wherein the communication channel comprises a Protocol Independent Multicast (PIM) reliable transport connection between the LHR and the RP router, and wherein establishing the communication channel comprises:

receiving, by the RP router from the LHR, a PIM targeted hello message that identifies the LHR; and sending, by the RP router to the LHR, a PIM targeted hello message that identifies the RP router, wherein, in response to exchanging the PIM targeted hello messages, the LHR establishes the PIM reliable transport connection with the RP router.

17. The method of claim 15, wherein the communication channel comprises one of:

User Datagram Protocol (UDP) register messages exchanged between the RP router and the LHR;

a multicast tree that uses a special group address to broadcast multicast session information;

or a PIM Dense Mode (DM) group-based approach used to flood source information messages.

18. The method of claim 15, wherein determining the at least one source that is actively providing traffic for the at least one multicast group comprises performing a lookup in the register database to determine each source in a list of sources that are actively providing traffic for the at least one multicast group.

19. The method of claim 15,
wherein receiving the request for source information for the at least one multicast group comprises receiving a PIM receiver-active message from the LHR requesting source information for all multicast groups included in the register database; and
wherein sending the source information for the at least one multicast group comprises sending a PIM source-active-response message to the LHR indicating addresses of all sources that are actively providing traffic for each of the multicast groups included in the register database.

20. The method of claim 15,
wherein receiving the request for source information for the at least one multicast group comprises receiving a PIM receiver-active message from the LHR requesting source information for an address of the at least one multicast group or a prefix-range of addresses that includes the at least one multicast group; and
wherein sending the source information for the at least one multicast group comprises sending a PIM source-active-response message to the LHR indicating an address of the at least one source that is actively providing traffic for the at least one multicast group.

21. The method of claim 15, further comprising:
in the case that the LHR no longer has interested receivers for the at least one multicast group, receiving a source information request update from the LHR for the at least one multicast group indicating that the LHR no longer has interested receivers for the at least one multicast group, and withdrawing, by the RP router, the LHR from the list of LHRs that have interested receivers for the at least one multicast group in the register database.

22. The method of claim 15, further comprising:
receiving, by the RP router from a first hop router (FHR) in the network, a register message indicating that the at least one source is actively providing traffic for the at least one multicast group, adding, by the RP router, the at least one source to a list of sources that are actively providing traffic for the at least one multicast group in the register database maintained by the RP, and wherein sending the source information for the at least one multicast group comprises sending an indication to the LHR that the at least one source has been added to the list of sources that are actively providing traffic for the at least one multicast group in the register database; and
upon receiving another register message from the FHR indicating that the at least one source is no longer actively providing traffic for the at least one multicast group, withdrawing, by the RP router, the at least one source from the list of sources that are actively providing traffic for the at least one multicast group in the register database, and sending a source information update to the LHR indicating that the at least one source has been withdrawn from the list of sources that are actively providing traffic for the at least one multicast group in the register database.

23. A network device operating as a rendezvous point (RP) router in a network, the RP router comprising:

a routing engine configured to establish a communication channel with a last hop router (LHR) in the network, maintain a register database to track multicast groups, sources that are active for the multicast groups, and LHRs that have expressed interest in the multicast groups, receive a request from the LHR via the communication channel for source information for at least one multicast group for which the LHR has interested receivers, upon receiving the request for source information, add the LHR to a list of LHRs that have interested receivers for the at least one multicast group in the register database maintained by the RP router, determine at least one source that is actively providing traffic for the at least one multicast group based on the register database, and send to the LHR via the communication channel the source information indicating the at least one source that is actively providing traffic for the at least one multicast group; and
a forwarding engine configured to forward traffic in the network.

24. The network device of claim 23, wherein the communication channel comprises a Protocol Independent Multicast (PIM) reliable transport connection between the LHR and the RP router, and wherein the routing engine is configured to:
receive a PIM targeted hello message that identifies the LHR from the LHR; and
send a PIM targeted hello message that identifies the RP router to the LHR, wherein, in response to exchanging the PIM targeted hello messages, the LHR establishes the PIM reliable transport connection with the RP router.

25. The network device of claim 23, wherein the communication channel comprises one of:
User Datagram Protocol (UDP) register messages exchanged between the RP router and the LHR;
a multicast tree that uses a special group address to broadcast multicast session information; or
a PIM Dense Mode (DM) group-based approach used to flood source information messages.

26. The network device of claim 23, wherein, to determine the at least one source that is actively providing traffic for the at least one multicast group, the routing engine is configured to perform a lookup in the register database to determine each source in a list of sources that are actively providing traffic for the at least one multicast group.

27. The network device of claim 23, wherein the routing engine is configured to:
receive a PIM receiver-active message from the LHR requesting source information for all multicast groups included in the register database; and
send a PIM source-active-response message to the LHR indicating addresses of all sources that are actively providing traffic for each of the multicast groups included in the register database.

28. The network device of claim 23, wherein the routing engine is configured to:
receive a PIM receiver-active message from the LHR requesting source information for an address of the at least one multicast group or a prefix-range of addresses that includes the at least one multicast group; and
send a PIM source-active-response message to the LHR indicating an address of the at least one source that is actively providing traffic for the at least one multicast group.

29. The network device of claim 23, wherein the routing engine is configured to:

in the case that the LHR no longer has interested receivers for the at least one multicast group, receive a source information request update from the LHR for the at least one multicast group indicating that the LHR no longer has interested receivers for the at least one multicast group, and withdraw the LHR from the list of LHRs that have interested receivers for the at least one multicast group in the register database.

30. The network device of claim 23, wherein the routing engine is configured to:

receive from a first hop router (FHR) in the network a register message indicating that the at least one source is actively providing traffic for the at least one multicast group, add the at least one source to a list of sources that are actively providing traffic for the at least one multicast group in the register database maintained by the RP, and send an indication to the LHR that the at least one source has been added to the list of sources that are actively providing traffic for the at least one multicast group in the register database; and upon receiving another register message from the FHR indicating that the at least one source is no longer actively providing traffic for the at least one multicast group, withdraw the at least one source from the list of sources that are actively providing traffic for the at least one multicast group in the register database, and send a source information update to the LHR indicating that the at least one source has been withdrawn from the list of sources that are actively providing traffic for the at least one multicast group in the register database.

* * * * *